United States Patent
Sugimoto

(10) Patent No.: US 8,566,614 B2
(45) Date of Patent: Oct. 22, 2013

(54) METHOD FOR OUTPUTTING IMAGE DATA, IMAGE PROCESSING APPARATUS, AND COMPUTER-READABLE STORAGE MEDIUM FOR COMPUTER PROGRAM

(75) Inventor: Tetsuya Sugimoto, Muko (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 388 days.

(21) Appl. No.: 12/880,846

(22) Filed: Sep. 13, 2010

(65) Prior Publication Data

US 2011/0066862 A1  Mar. 17, 2011

(30) Foreign Application Priority Data

Sep. 15, 2009 (JP) ................. 2009-212640

(51) Int. Cl.
*G06F 21/00* (2013.01)
(52) U.S. Cl.
USPC .......................................................... 713/189
(58) Field of Classification Search
None
See application file for complete search history.

(56) References Cited

U.S. PATENT DOCUMENTS

| | | | | |
|---|---|---|---|---|
| 7,839,517 B1* | 11/2010 | Kinjo | ............................ | 358/1.15 |
| 8,139,235 B2* | 3/2012 | Asakura | ......................... | 358/1.1 |
| 8,144,359 B2* | 3/2012 | Sawayanagi et al. | ......... | 358/1.16 |
| 8,209,762 B2* | 6/2012 | Hong | .............................. | 726/26 |
| 2007/0147794 A1 | 6/2007 | Araki | | |
| 2007/0229897 A1* | 10/2007 | Kato et al. | .................... | 358/1.16 |
| 2007/0250717 A1* | 10/2007 | Kumagai et al. | .............. | 713/176 |
| 2007/0283157 A1* | 12/2007 | Yami et al. | .................... | 713/175 |
| 2007/0283446 A1* | 12/2007 | Yami et al. | ...................... | 726/27 |
| 2008/0151299 A1 | 6/2008 | Takahata | | |
| 2008/0244721 A1* | 10/2008 | Barrus et al. | ...................... | 726/9 |
| 2008/0309961 A1 | 12/2008 | Aichi et al. | | |
| 2009/0313433 A1* | 12/2009 | Asakura | ......................... | 711/115 |
| 2009/0320127 A1* | 12/2009 | Hong | .............................. | 726/21 |
| 2010/0082699 A1 | 4/2010 | Miyasa et al. | | |
| 2011/0069353 A1* | 3/2011 | Sawayanagi et al. | ......... | 358/1.16 |

FOREIGN PATENT DOCUMENTS

| | | |
|---|---|---|
| JP | 2000-81959 | 3/2000 |
| JP | 2003-125236 | 4/2003 |
| JP | 2005-100019 | 4/2005 |
| JP | 2006-67368 | 3/2006 |
| JP | 2006-88340 | 4/2006 |
| JP | 2008-178066 | 7/2008 |

OTHER PUBLICATIONS

Japanese Notification of Reason(s) for Refusal mailed Aug. 16, 2011, directed to counterpart Japanese Patent Application No. 2009-212640; 7 pages.

Decision to Grant a Patent mailed Aug. 16, 2011, directed to Japanese Application No. 2009-218549; 8 pages.

* cited by examiner

*Primary Examiner* — Oscar Louie
(74) *Attorney, Agent, or Firm* — Morrison & Foerster LLP

(57) ABSTRACT

A method for outputting image data generated by an image processing apparatus to a portable storage medium connected to an interface is provided. The method includes the following steps of: issuing an identifier of the image data; writing the identifier into the storage medium without waiting for the image data to be generated completely; after generating the image data, associating the image data with the identifier and storing the image data in a storage portion; reading out the identifier from the storage medium when the storage medium is connected to the interface again; and writing, into the storage medium, the image data stored in the storage portion in association with the identifier thus read out.

6 Claims, 10 Drawing Sheets

METHOD FOR OUTPUTTING IMAGE DATA, IMAGE PROCESSING APPARATUS, AND COMPUTER-READABLE STORAGE MEDIUM FOR COMPUTER PROGRAM

This application is based on Japanese patent application No. 2009-212640 filed on Sep. 15, 2009, the contents of which are hereby incorporated by reference.

BACKGROUND OF THE INVENTION

1. Field of the Invention

The present invention relates to a method, an apparatus, and the like for outputting image data to a portable storage medium.

2. Description of the Related Art

Image processing apparatuses having a variety of functions, such as copying, PC printing, scanning, faxing, and file server, have recently come into widespread use. Such image processing apparatuses are sometimes called "multifunction devices", "Multi-Function Peripherals (MFPs)", or the like. Such an image processing apparatus has been provided with a Universal Serial Bus (USB) serving as an interface to connect the image processing apparatus to another device.

In recent years, a portable mass storage medium such as a USB flash memory or a portable hard disk has become inexpensive. This enables a user to readily save image data obtained through the scan function of an image processing apparatus into such a portable mass storage medium without worrying about the size of the image data.

The following method is proposed as a method in which an image processor is made in cooperation with a storage medium to perform image-related processing. The image processor for managing print process information necessary for acquiring print results with a predetermined printing device is configured to select various process data constituting print process information when the mounting of portable medium is detected, and to register the print process information in the medium when a print process based on the print process information including generated print image data and the selected various process data is completed (see Japanese Laid-open Patent Publication No. 2005-100019).

In the meantime, the improvement in performance of an image processing apparatus enables the same to perform complex image processing as compared with conventional apparatuses. An image processing apparatus is often shared by a plurality of users. Under such circumstances, many jobs are sometimes concentrated in one image processing apparatus around the same time.

Accordingly, it sometimes takes a long time from when a user gives a command to the image processing apparatus to when the image processing apparatus completes necessary image processing on image data obtained through the scan function of the image processing apparatus. In such a case, the user has to wait for the image data to be saved in a storage medium such as a USB flash memory around the image processing apparatus. In terms of the security, it is undesirable for the user to leave the image processing apparatus with the storage medium inserted thereinto.

SUMMARY

The present disclosure is directed to solve the problems pointed out above, and therefore, an object of an embodiment of the present invention is to, when a user obtains image data from an image processing apparatus by using a portable storage medium, avoid keeping him/her waiting around the image processing apparatus, and at the same time, to increase the security for a case where the image data is sent and received.

According to an aspect of the present invention, a method for outputting image data generated by an image processing apparatus to a portable storage medium connected to an interface is provided. The method includes a first step of issuing an identifier of the image data; a second step of writing the identifier into the storage medium without waiting for the image data to be generated completely; a third step of, after generating the image data, associating the image data with the identifier and storing the image data in a storage portion; a fourth step of reading out the identifier from the storage medium when the storage medium is connected to the interface again; and a fifth step of writing, into the storage medium, the image data stored in the storage portion in association with the identifier thus read out.

Preferably, the second step includes encrypting the identifier by using an encryption key of a user who has given a command to generate the image data and writing the identifier thus encrypted into the storage medium. Preferably, the method further includes a sixth step, subsequent to the fourth step, of decrypting the identifier. Preferably, the fifth step includes writing, into the storage medium, the image data stored in the storage portion in association with the identifier thus decrypted.

According to an aspect of the present invention, a method for outputting image data generated by an image processing apparatus to a portable storage medium connected to an interface is provided. The method includes a first step of reading out, from the storage medium, an identifier of the storage medium without waiting for the image data to be generated completely; a second step of, after generating the image data, associating the image data with the identifier and storing the image data in a storage portion; a third step of reading out the identifier from the storage medium when the storage medium is connected to the interface again; and a fourth step of writing, into the storage medium, the image data stored in the storage portion in association with the identifier thus read out.

Preferably, the second step includes encrypting the image data by using an encryption key of a user who has given a command to generate the image data and storing the image data thus encrypted in the storage portion, and the fourth step includes decrypting the image data and writing the image data thus decrypted into the storage medium.

These and other characteristics and objects of the present invention will become more apparent by the following descriptions of preferred embodiments with reference to drawings.

DESCRIPTION OF THE PREFERRED EMBODIMENTS

First Embodiment

Figure 1:
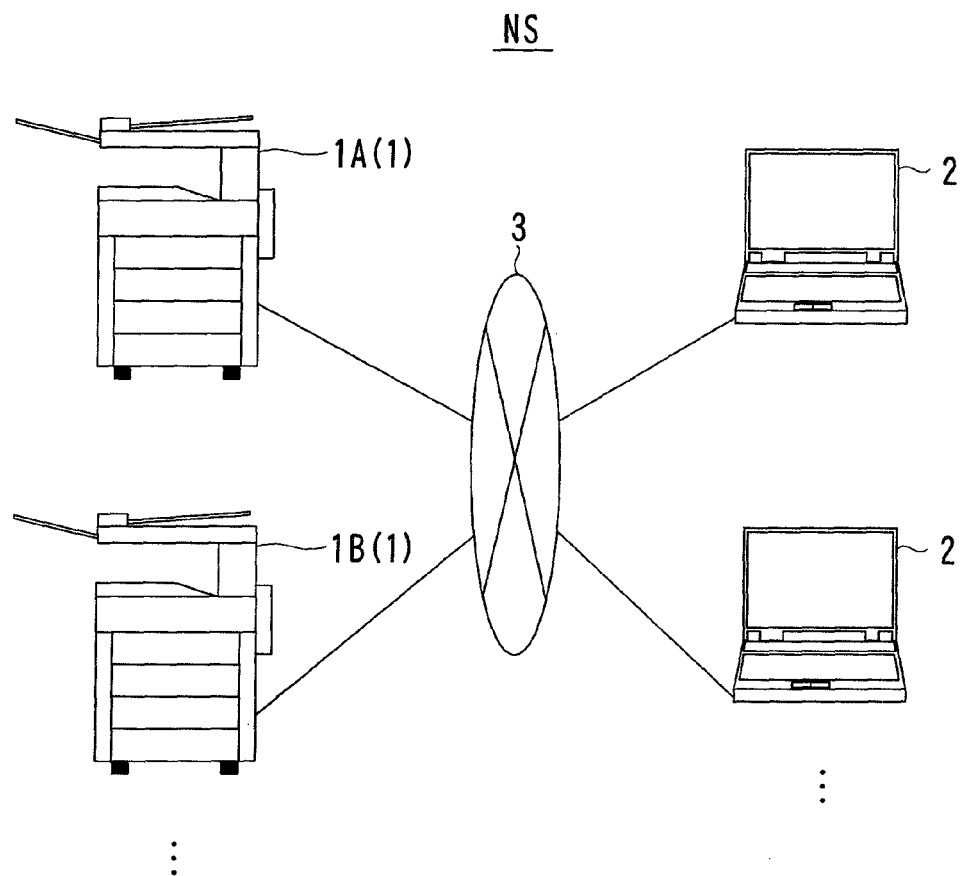
FIG. 1 is a diagram illustrating an example of the overall configuration of a network system.
Figure 2:
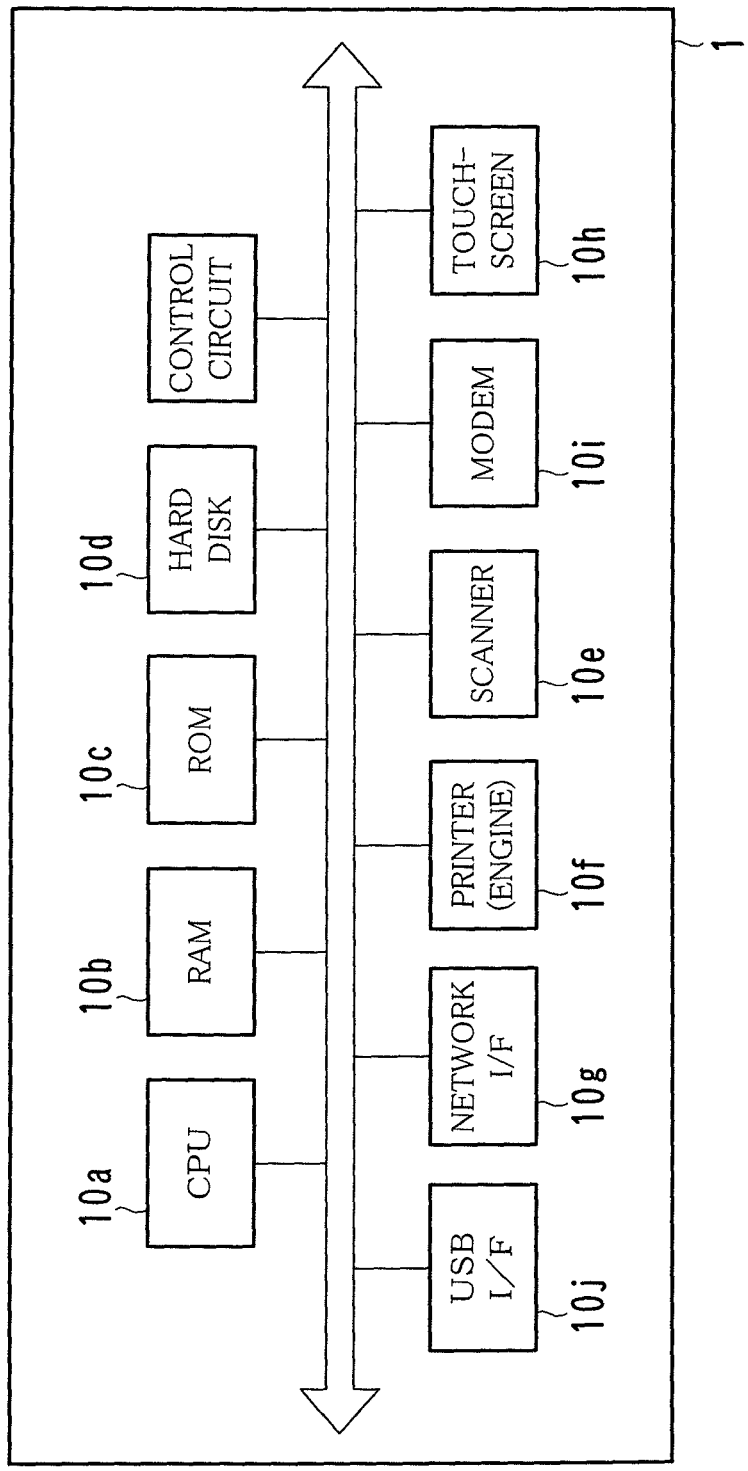
FIG. 2 is a diagram illustrating an example of the hardware configuration of an image forming apparatus.
Figure 3:
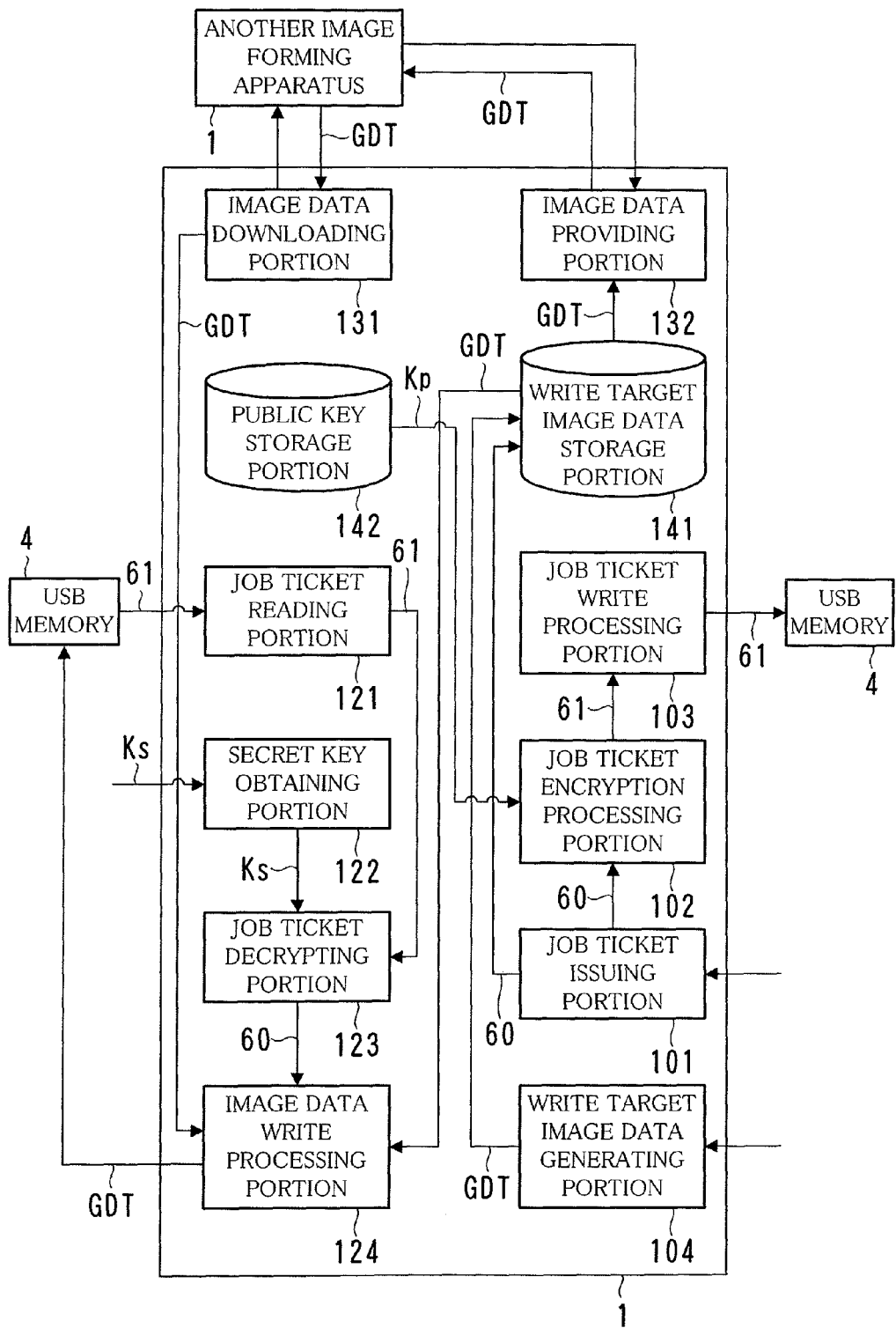
FIG. 3 is a diagram illustrating an example of the functional configuration of an image forming apparatus.

FIG. 1 is a diagram illustrating an example of the overall configuration of a network system NS; FIG. 2 is a diagram illustrating an example of the hardware configuration of an image forming apparatus 1; and FIG. 3 is a diagram illustrating an example of the functional configuration of the image forming apparatus 1.

Referring to FIG. 1, the network system NS is configured of a plurality of the image forming apparatuses 1, one or more terminals 2, a communication line 3, and so on. The individual image forming apparatuses 1 and the individual terminals 2 are connectable to one another via the communication line 3. Examples of the communication line 3 are a public line, a dedicated line, the Internet, and a so-called Local Area Network (LAN).

The network system NS is installed in organizations such as business offices or public offices, and is used by members belonging to such an organization. The following is a description of an example in which the network system NS is used in an X-company. An employee of the X-company is hereinafter referred to as a "user". Each user is given a unique user Identification (ID) and a pair of a public key Kp and a secret key Ks.

The image forming apparatus 1 is an image processing apparatus generally called a multifunction device or a Multi Function Peripheral (MFP). The image forming apparatus 1 is a device that integrates a variety of functions, such as copying, PC printing (network printing), faxing, scanning, and so on, into a single unit.

Referring to FIG. 2, the image forming apparatus 1 is configured of a Central Processing Unit (CPU) 10*a*, a Random Access Memory (RAM) 10*b*, a Read-Only Memory (ROM) 10*c*, a hard disk 10*d*, a scanner 10*e*, a printer 10*f*, a network interface 10*g*, a touchscreen 10*h*, a modem 10*i*, a Universal Serial Bus (USB) interface 10*j*, a control circuit, and so on.

The scanner 10*e* is a device to read images depicted on paper, i.e., images such as photographs, characters, drawings, diagrams, and the like, and create image data thereof.

The printer 10*f* serves to print, onto paper, an image obtained by scanning with the scanner 10*e* or an image included in image data received from another device.

The touchscreen 10*h* displays, for example, a screen for giving a message to a user, a screen for displaying the result of a process, and a screen for the user to enter a command to be given to the image forming apparatus 1. The touchscreen 10*h* also detects a position thereof touched (pressed) by the user and informs the CPU 10*a* of the touched position.

The user performs operation on the touchscreen 10*h*; thereby to give a command to the image forming apparatus 1 or to enter data thereinto.

The network interface 10*g* is a Network Interface Card (NIC) for communicating with another device such as the terminal 2 according to Transmission Control Protocol/Internet Protocol (TCP/IP) or another protocol via the communication line 3.

The modem 10*i* is a device for performing communication with another facsimile terminal via a fixed-line telephone network based on a protocol such as G3.

The USB interface 10*j* is a USB interface board for performing communication with a device compatible with USB standards, i.e., a so-called USB device.

Referring to FIG. 3, the ROM 10*c* or the hard disk 10*d* stores programs and data for implementing functions of a job ticket issuing portion 101, a job ticket encryption processing portion 102, a job ticket write processing portion 103, a write target image data generating portion 104, a job ticket reading portion 121, a secret key obtaining portion 122, a job ticket decrypting portion 123, an image data write processing portion 124, an image data downloading portion 131, an image data providing portion 132, a write target image data storage portion 141, a public key storage portion 142, and the like. These programs are loaded into the RAM 10*b* as necessary, whereupon the programs are executed by the CPU 10*a*.

The whole or a part of the functions of the individual portions illustrated in FIG. 3, and the like may be implemented merely by hardware such as a circuit.

The user directly operates the image forming apparatus 1 to cause the same to execute a copy job, a fax job, a scan job, or the like. The user also operates the terminal 2 to cause the image forming apparatus 1 to execute a PC print job.

In particular, according to this embodiment, the user may cause the image forming apparatus 1 to execute a job of scanning an image depicted on paper, creating image data of the image, and storing the created image data into a USB flash memory. The job is generally called a "Scan_To_USB job". The individual portions illustrated in FIG. 3 mainly perform a process for the Scan_To_USB job.

Hereinafter, the individual image forming apparatuses 1 are sometimes distinguished from one another as an "image forming apparatus 1A", an "image forming apparatus 1B", . . . , and so on.

Referring back to FIG. 1, a driver for causing the image forming apparatus 1 to perform a process for printing an image is installed on the terminal 2. Examples of the terminal 2 are a personal computer and a Personal Digital Assistant (PDA).

Figure 4:
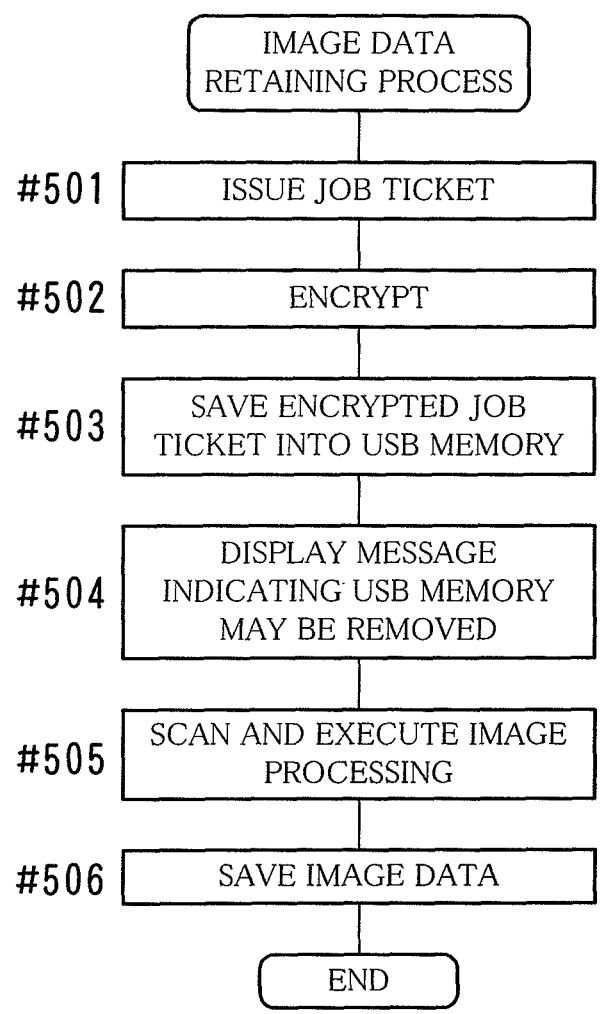
FIG. 4 is a flowchart depicting an example of the flow of an image data retaining process.
Figure 5:
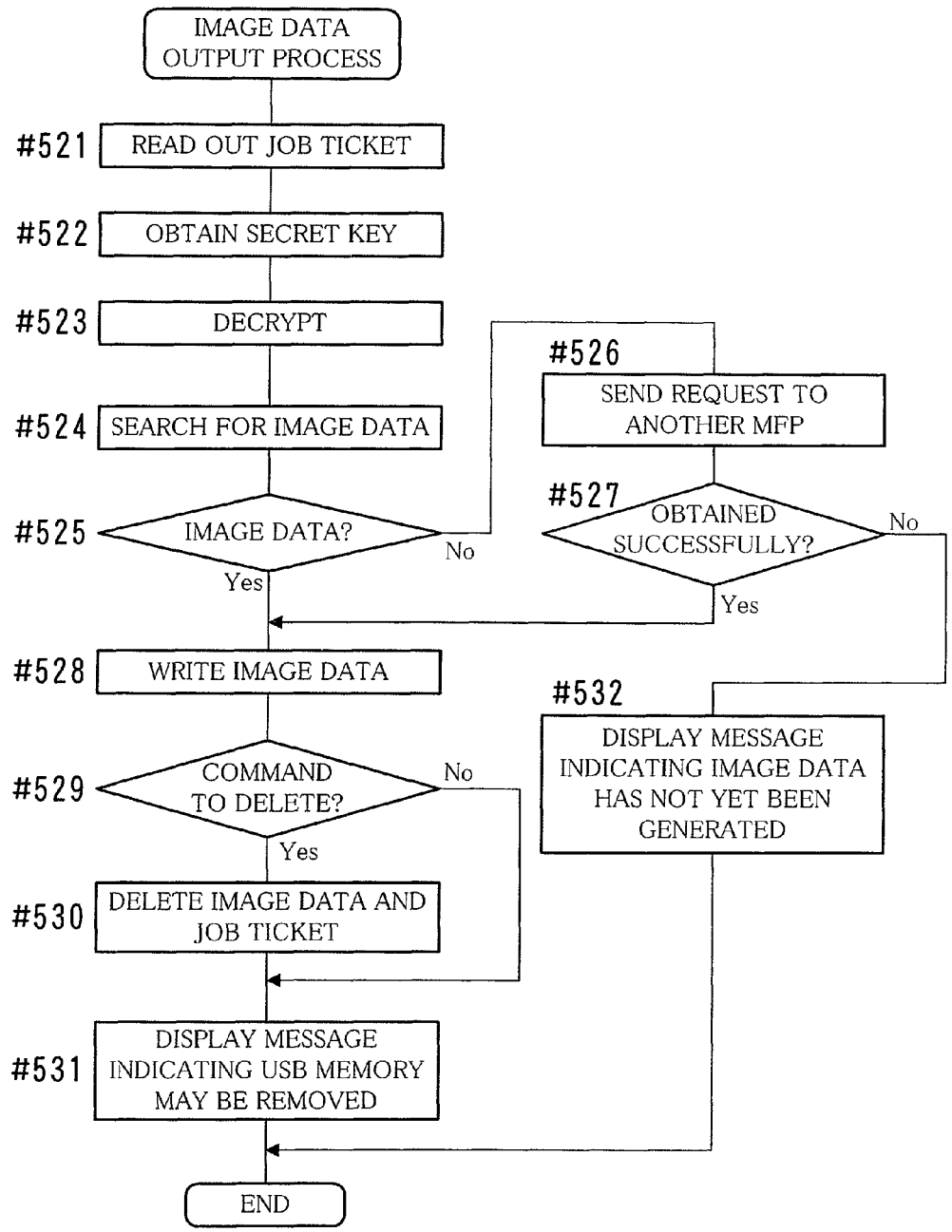
FIG. 5 is a flowchart depicting an example of the flow of an image data output process.

FIG. 4 is a flowchart depicting an example of the flow of an image data retaining process, and FIG. 5 is a flowchart depicting an example of the flow of an image data output process. The following is a description of processing details of the individual portions shown in FIG. 3, and the like.

The public key storage portion 142 stores, therein, for each user, a public key Kp and a user ID associated with each other. Note that a user strictly controls his/her secret key Ks to prevent the secret key Ks from being stolen by a third party. As discussed below, the secret key Ks is used in order to store image data into a USB flash memory.

[Retaining Process to Obtain Image Data GDT]

In the case where a user intends to create image data of an image depicted on paper and to store the image data into a USB flash memory 4, the user performs the following operation. The user logs onto the image forming apparatus 1 using his/her user ID. The user, then, places the paper on the scanner 10*e* and inserts the USB flash memory 4 into the USB interface 10*j*. Further, the user enters a command to execute a Scan_To_USB job.

In the meantime, since a Scan_To_USB job involves image processing, it sometimes takes a long time from when the user gives such a command to when image data is completely created. If there is another job that has not yet been executed though a command to execute the job was already given, a time longer than the above is sometimes required to completely create image data.

To cope with this, the job ticket issuing portion 101, the job ticket encryption processing portion 102, the job ticket write processing portion 103, and the write target image data generating portion 104 of the image forming apparatus 1 perform a process for making it possible to store image data into the USB flash memory 4 in a secure manner when the user comes to the installation site of the subject image forming apparatus 1 next time. The process is described below with reference to the flowchart shown in FIG. 4.

The job ticket issuing portion 101 receives the command to execute the Scan_To_USB job, and issues a unique identifier for distinguishing the Scan_To_USB job from another job (#501 of FIG. 4). The identifier is used as a ticket that is to be exchanged for image data when the user comes to the installation site of the image forming apparatus 1 next time. In view of this, the identifier is hereinafter referred to as a "job ticket 60". The job ticket issuing portion 101 desirably incorporates, in advance, the identifier of the subject image forming apparatus 1, e.g., the IP address thereof, into the job ticket 60.

The job ticket encryption processing portion 102 encrypts the job ticket 60 issued by the job ticket issuing portion 101 (#502). At this time, a public key Kp stored in the public key storage portion 142 and corresponding to the user ID of the logged-on user is used as an encryption key. The job ticket 60 that has undergone the encryption process is hereinafter referred to as an "encrypted job ticket 61".

The job ticket write processing portion 103 performs a process for writing the encrypted job ticket 61 created by the job ticket encryption processing portion 102 into the USB flash memory 4 inserted into the USB interface 10*j* (#503). After completing the write process successfully, the job ticket write processing portion 103 controls the touchscreen 10*h* to display a message indicating that the USB flash memory 4 may be removed from the USB interface 10*j* (#504).

The write target image data generating portion 104 controls the scanner 10*e* to perform a process for scanning the image depicted on the paper placed on the scanner 10*e*. The write target image data generating portion 104, thereby, generates image data GDT to be written (stored) into the USB flash memory 4 (#505). To be specific, the write target image data generating portion 104 causes the scanner 10*e* to scan the image on the paper; thereby to obtain raw data of the image. The write target image data generating portion 104 converts the format of the raw data into a format specified by the user or a default format, e.g., Tagged Image File Format (TIFF) or Portable Document Format (PDF), so that the image data GDT is generated. Further, in the process of generating the image data GDT, the write target image data generating portion 104 appropriately uses an Optical Character Reader (OCR) function to create text data from the whole or a part of the image, corrects the inclination of the image, or removes the noise thereof.

The process for generating the image data GDT may be performed in parallel with the process for issuing a job ticket.

The image data GDT generated is then associated with the job ticket 60 issued by the job ticket issuing portion 101, and is stored in the write target image data storage portion 141 (#506).

After confirming the message displayed in Step #504, the user may remove the USB flash memory 4 from the image forming apparatus 1, carry the paper, and leave the location of the image forming apparatus 1 once. When the user comes to the installation site of the image forming apparatus 1 next time, the user can store the image data GDT into the USB flash memory 4.

[Process for Storing Image Data GDT into USB Flash Memory 4]

When the user comes to the location of the image forming apparatus 1 again, he/she logs thereonto using his/her user ID. The user, then, inserts the USB flash memory 4 into the USB interface 10*j*. Note, however, that the USB flash memory 4 inserted here should be identical to the USB flash memory 4 used last time.

It is possible that the user comes to the location of the same image forming apparatus 1 as the image forming apparatus 1 onto which he/she logged last time, or, comes to the location of another image forming apparatus 1.

The processing details of the individual portions of each image forming apparatus 1 will be described below for separated two cases, i.e., Case_A and Case_B with reference to the flowchart of FIG. 5.

Case_A: A case where a user comes to the location of an image forming apparatus 1A to give a command to execute a Scan_To_USB job thereto, and thereafter comes to the location of the image forming apparatus 1A again.

Case_B: A case where a user comes to the location of an image forming apparatus 1B to give a command to execute a Scan_To_USB job thereto, and thereafter comes to the location of the image forming apparatus 1A next time instead of the image forming apparatus 1B.

In Case_A, a job ticket reading portion 121, a secret key obtaining portion 122, a job ticket decrypting portion 123, and an image data write processing portion 124 of the image forming apparatus 1A perform the following process.

The job ticket reading portion 121 reads out the encrypted job ticket 61 from the USB flash memory 4 inserted into a USB interface 10*j* (#521).

The secret key obtaining portion 122 performs a process for obtaining a secret key Ks of the logged-on user (#522). For example, the secret key obtaining portion 122 requests the user to enter the secret key Ks by displaying a message on the touchscreen 10*h*. The secret key obtaining portion 122 obtains a character string entered by the user as the secret key Ks. Alternatively, if the inserted USB flash memory 4 stores the secret key Ks therein, then the secret key obtaining portion 122 obtains the secret key Ks by reading out the same from the USB flash memory 4.

The job ticket decrypting portion 123 uses the secret key Ks obtained by the secret key obtaining portion 122 to decrypt the encrypted job ticket 61 read out by the job ticket reading portion 121 (#523). As a result, a plain text of the encrypted job ticket 61, or, in other words, the job ticket 60 is reproduced.

The image data write processing portion 124 searches for image data GDT associated with the reproduced job ticket 60 in the write target image data storage portion 141 (#524). As long as such image data GDT has already been created, the image data GDT is sure to be found after the search (Yes in #525). The image data write processing portion 124 reads out the image data GDT thus found from the write target image data storage portion 141, and writes the image data GDT onto the USB flash memory 4 (#528).

If the user enters a command to delete the image data GDT (Yes in #529), then the image data GDT is deleted form the write target image data storage portion 141, and further, the encrypted job ticket 61 corresponding to the image data GDT is also deleted from the USB flash memory 4 (#530). Alternatively, it is also possible to delete only either the image data GDT or the encrypted job ticket 61 in accordance with selection by the user. The same applies to the descriptions hereinafter.

After that, the image data write processing portion 124 displays, on the touchscreen 10h, a message indicating that the Scan_To_USB job has been completed and therefore the USB flash memory 4 may be removed from the USB interface 10j (#531).

On the other hand, in the case where image data GDT associated with the reproduced job ticket 60 is not found after the search (No in #525), the subject image forming apparatus 1 attempts to obtain the image data GDT from another image forming apparatus 1 (#526). This will be detailed later as the process corresponding to Case_B.

If image data GDT associated with the reproduced job ticket 60 is not found after the search (No in #525, and No in #527), then the image data write processing portion 124 displays, on the touchscreen 10h, a message indicating that such image data GDT has not yet been generated (#532).

In Case_B, the job ticket reading portion 121, the secret key obtaining portion 122, the job ticket decrypting portion 123, the image data write processing portion 124, and an image data downloading portion 131 of the image forming apparatus 1A perform the following process in cooperation with an image data providing portion 132 of the image forming apparatus 1B.

As with Case_A, the job ticket reading portion 121, the secret key obtaining portion 122, and the job ticket decrypting portion 123 of the image forming apparatus 1A read out the encrypted job ticket 61 from the USB flash memory 4 inserted into the USB interface 10j (#521), obtain a secret key Ks of the logged-on user (#522), use the secret key Ks to decrypt the encrypted job ticket 61, and reproduce the job ticket 60 (#523).

The image data write processing portion 124 searches for image data GDT associated with the reproduced job ticket 60 in the write target image data storage portion 141 (#524). However, such image data GDT is not found in the write target image data storage portion 141 of the image forming apparatus 1A because it is not stored therein. If the image data GDT is not found therein (No in #525), then the image data downloading portion 131 requests another image forming apparatus 1 for the image data GDT and obtains the same (#526). At this time, the image forming apparatus 1A informs another image forming apparatus 1 of the reproduced job ticket 60. Such a request may be made using multicast technology. However, in the case where the job ticket 60 contains an identifier such as an IP address, the request may be made only to another image forming apparatus 1 corresponding to the identifier.

Upon receiving the information, the image data providing portion 132 of the image forming apparatus 1B reads out image data GDT corresponding to the informed job ticket 60 from the write target image data storage portion 141 of the image forming apparatus 1B, and transmits the image data GDT thus read out to the image forming apparatus 1A as the request source. If such image data GDT has not yet been generated, then the image data providing portion 132 of the image forming apparatus 1B sends a message indicating that such image data GDT has not yet been generated to the image forming apparatus 1A.

With the image forming apparatus 1A, if the image data GDT is successfully obtained (Yes in #527), then the image data write processing portion 124 writes the image data GDT onto the USB flash memory 4 (#528). The image data write processing portion 124 deletes the encrypted job ticket 61 from the USB flash memory 4 appropriately in accordance with a command from the user, and requests the image forming apparatus 1B from which the image data GDT has been sent to delete the image data GDT (Yes in #529, and #530).

ON the other hand, if the message indicating that image data GDT has not yet been generated (No in #525, and No in #527), then, as with Case_A, the image data write processing portion 124 displays, on the touchscreen 10h, a message indicating that such image data GDT has not yet been generated (#532).

Figure 6:
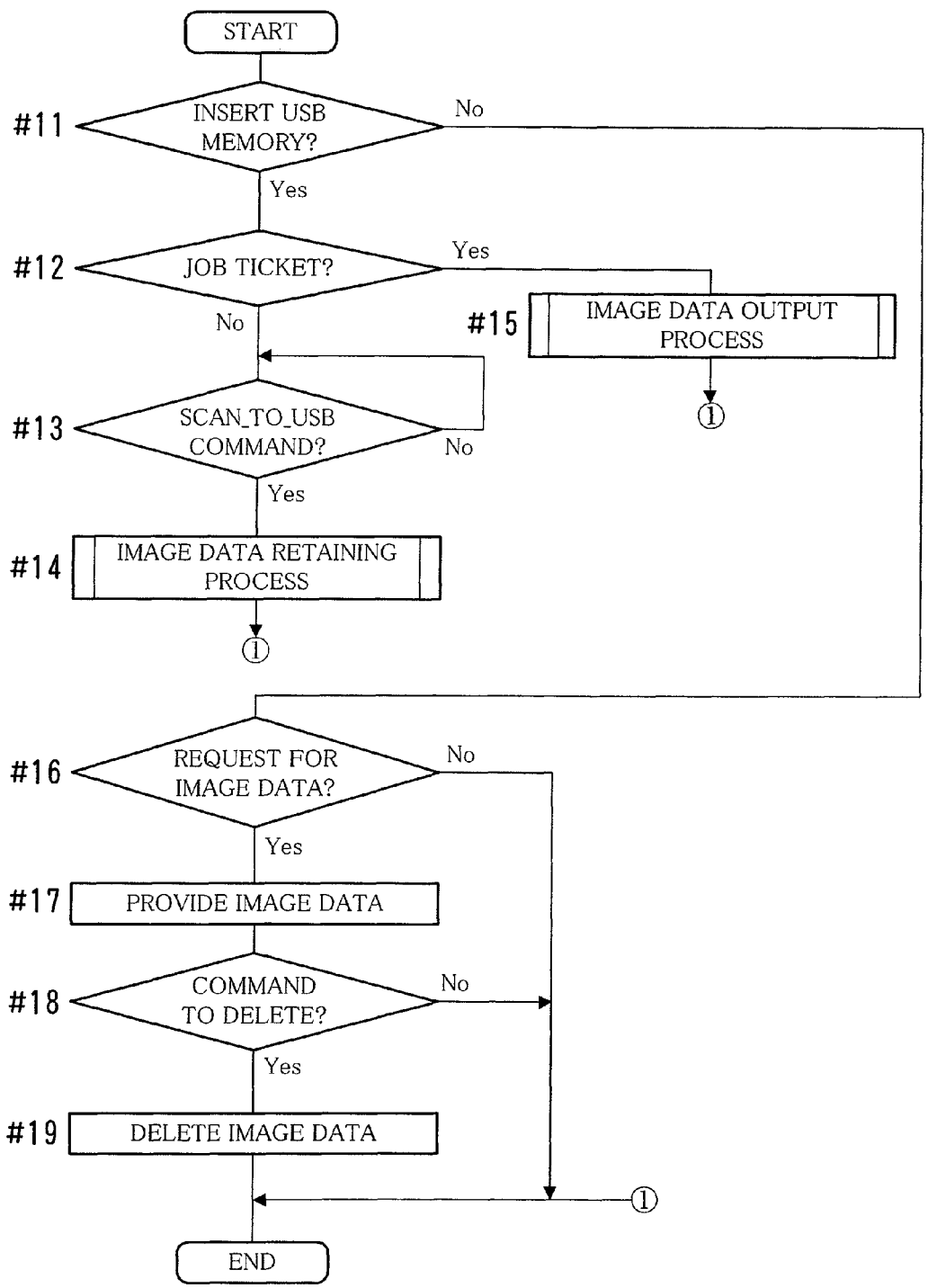
FIG. 6 is a flowchart depicting an example of the overall processing flow of an image forming apparatus according to a first embodiment.

FIG. 6 is a flowchart depicting an example of the overall processing flow of the image forming apparatus 1 according to the first embodiment.

The overall processing flow for a Scan_To_USB job in the first embodiment will be described below with reference to the flowchart of FIG. 6.

Every time an event occurs, the image forming apparatus 1 performs a process in accordance with the event in the following manner.

Referring to FIG. 6, when a USB flash memory 4 is inserted into the USB interface 10j (Yes in #11), the image forming apparatus 1 waits for a command to execute a Scan_To_USB job unless an encrypted job ticket 61 is stored in the USB flash memory 4 (No in #12). When the command to execute the Scan_To_USB job is entered (Yes in #13), the image forming apparatus 1 performs a process for enabling a user to obtain image data GDT quickly for a case where he/she uses the image forming apparatus 1 next time (#14). The steps of the process are described earlier with reference to FIG. 4.

On the other hand, if an encrypted job ticket 61 is stored in the USB flash memory 4 (Yes in #12), then the image forming apparatus 1 performs a process for saving image data GDT into the USB flash memory 4 (#15). The steps of the process are described earlier with reference to FIG. 5.

Alternatively, when the image forming apparatus 1 receives a request for image data GDT from another image forming apparatus 1 (No in #11, and Yes in #16), the subject image forming apparatus 1 reads out the requested image data GDT from the write target image data storage portion 141 thereof and provides the same to another image forming apparatus 1 as the request source (#17). Thereafter, when receiving a command to delete that image data GDT, the subject image forming apparatus 1 deletes the image data GDT from the write target image data storage portion 141 thereof (#19).

Second Embodiment

Figure 7:
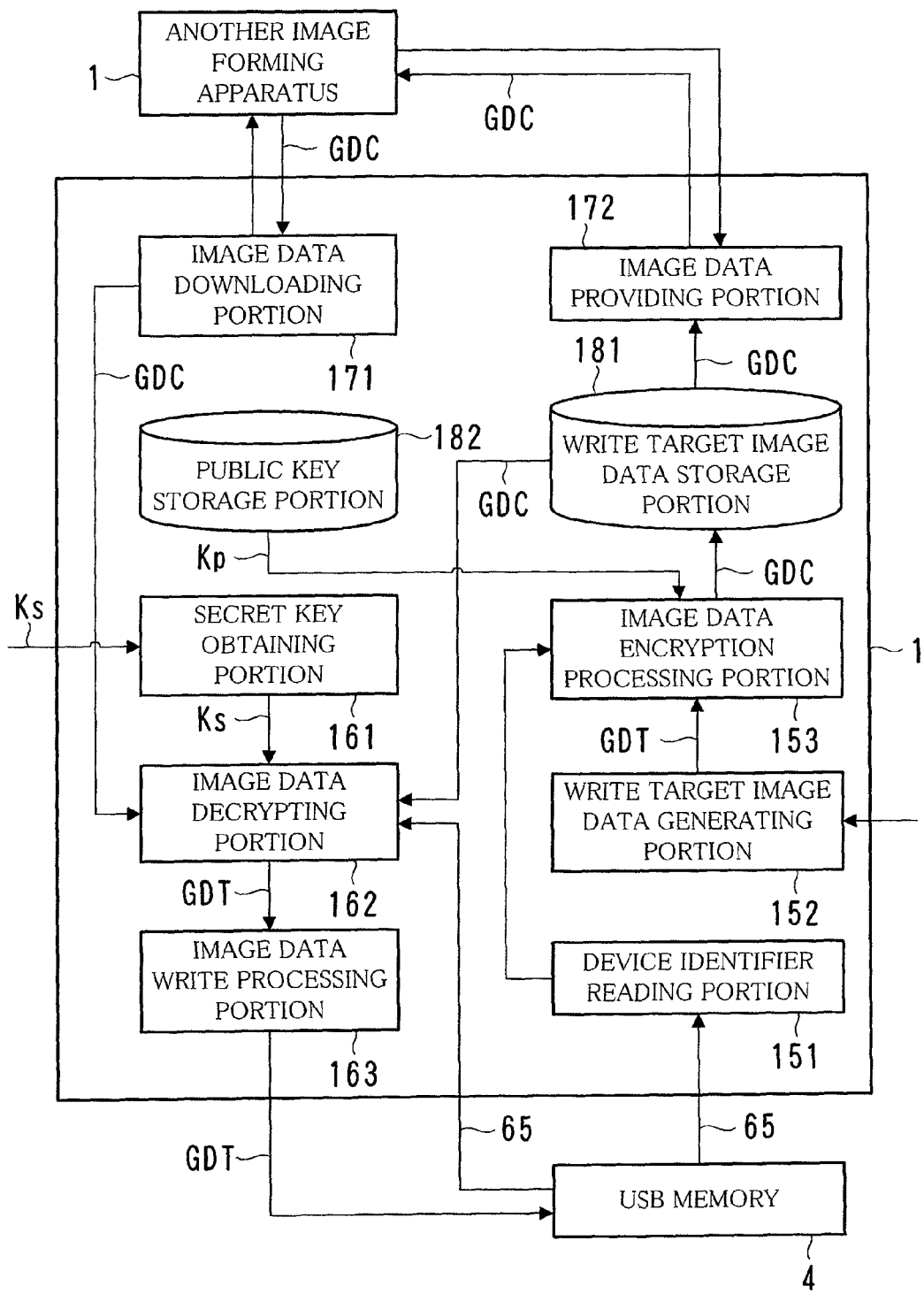
FIG. 7 is a diagram illustrating a modification of the functional configuration of an image forming apparatus.
Figure 8:
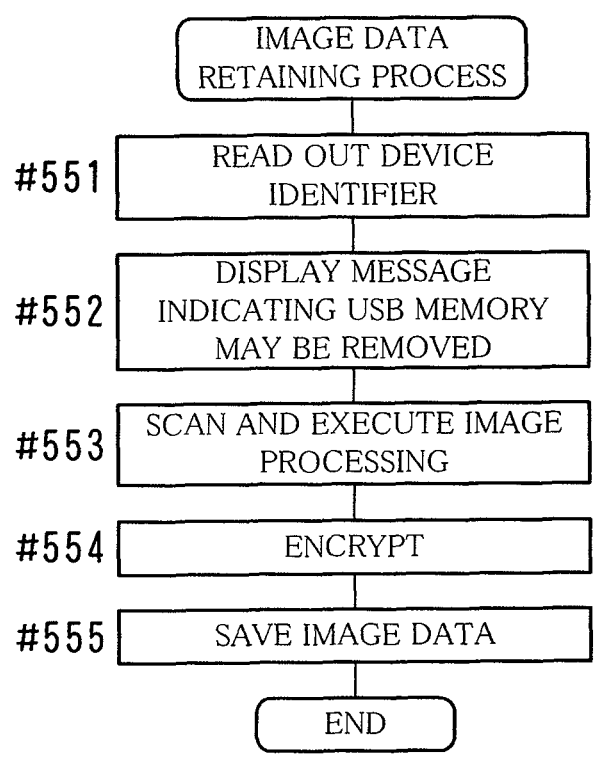
FIG. 8 is a flowchart depicting a modification of the flow of an image data retaining process.
Figure 9:
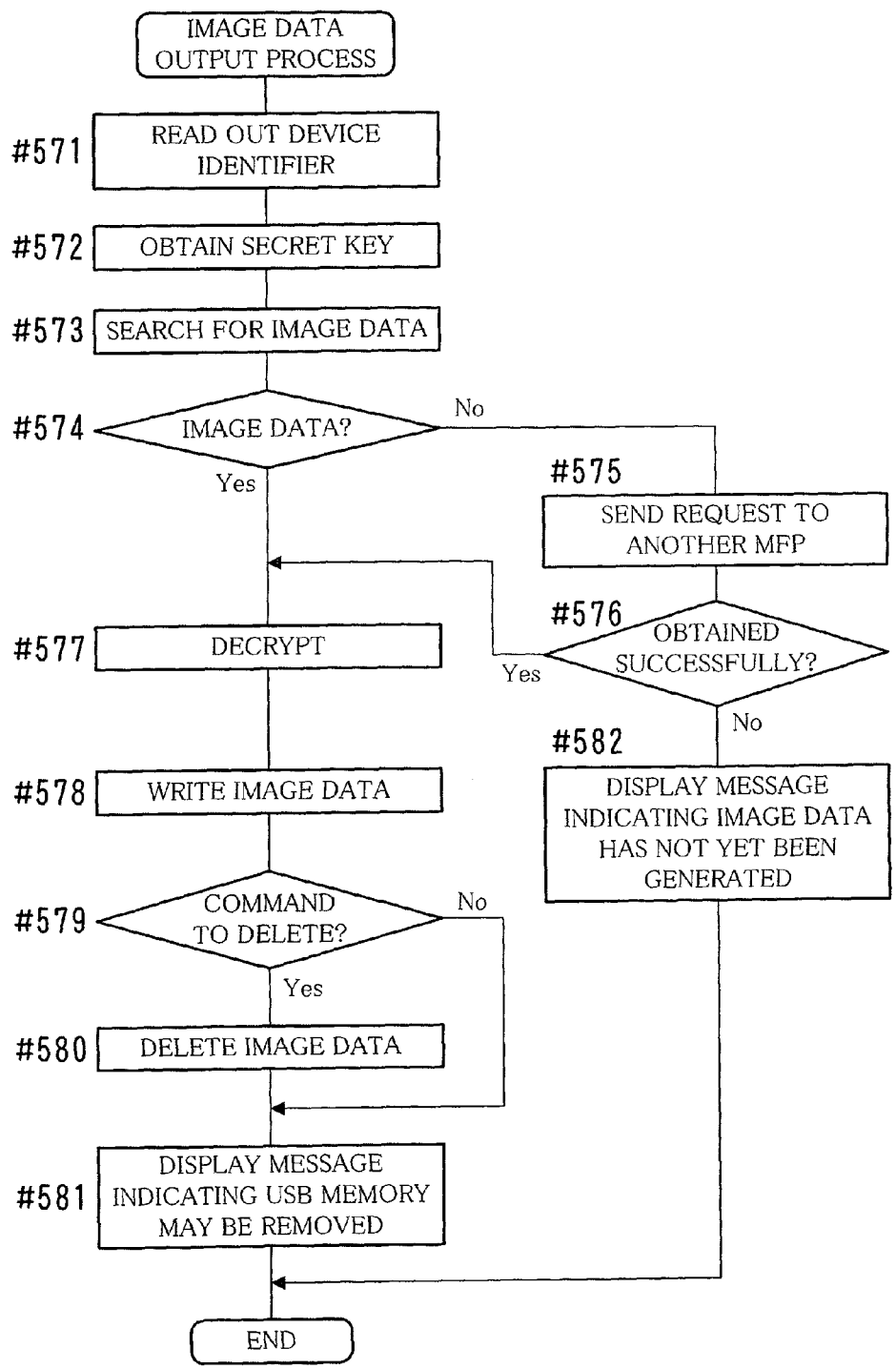
FIG. 9 is a flowchart depicting a modification of the flow of an image data output process.

FIG. 7 is a diagram illustrating a modification of the functional configuration of the image forming apparatus 1; FIG. 8 is a flowchart depicting a modification of the flow of the image data retaining process; and FIG. 9 is a flowchart depicting a modification of the flow of an image data output process.

In the first embodiment, the image forming apparatus 1 retains image data GDT by storing a job ticket into the USB flash memory 4. Unlike the first embodiment, the image forming apparatus 1 according to the second embodiment retains image data GDT without storing a job ticket into the USB flash memory 4.

The configuration of the network system NS of the second embodiment is the same as that of the first embodiment shown in FIG. 1. The hardware configuration of the image forming apparatus 1 is also the same as that of the first embodiment shown in FIG. 2.

Unlike the first embodiment, referring to FIG. 7, the ROM 10c and the hard disk 10d of the image forming apparatus 1 according to the second embodiment store programs and data for implementing functions of a device identifier reading portion 151, a write target image data generating portion 152, an image data encryption processing portion 153, a secret key obtaining portion 161, an image data decrypting portion 162, an image data write processing portion 163, an image data downloading portion 171, an image data providing portion 172, a write target image data storage portion 181, a public key storage portion 182, and the like. The whole or a part of the functions of the individual portions illustrated in FIG. 7, and the like may be implemented merely by hardware such as a circuit.

The following is a description of processing details of the individual portions shown in FIG. 7, and the like. Description of points common to the first embodiment shall be omitted.

As with the write target image data storage portion 141 (see FIG. 3) of the first embodiment, the public key storage portion 182 stores, therein, for each user, a public key Kp and a user ID associated with each other.

[Retaining Process to Obtain Image Data GDT]

In the case where the user intends to create image data of an image depicted on paper and to store the image data into a USB flash memory 4, as with the first embodiment, the user logs onto the image forming apparatus 1 using his/her user ID, places the paper on the scanner 10e, and inserts the USB flash memory 4 into the USB interface 10j. The user then enters a command to execute a Scan_To_USB job.

Note that the USB flash memory 4 to be used here is required to store in advance, therein, a device identifier 65 for distinguishing the subject USB flash memory 4 from other USB memories. Examples of the USB flash memory 4 are a USB flash memory into which a device identifier 65 has been already stored before shipping, and a USB flash memory into which a device identifier 65 has been stored immediately before using the USB flash memory in the network system NS.

Upon receiving the command to execute the Scan_To_USB job, the device identifier reading portion 151, the write target image data generating portion 152, and the image data encryption processing portion 153 perform a process for making it possible to store image data into the USB flash memory 4 in a secure manner when the user comes to the installation site of the subject image forming apparatus 1 next time. The process is described below with reference to the flowchart shown in FIG. 8.

The device identifier reading portion 151 reads out the device identifier 65 from the USB flash memory 4 inserted into the USB interface 10j (#551 of FIG. 8). Upon reading out the device identifier 65 successfully, the device identifier reading portion 151 controls the touchscreen 10h to display a message indicating that the USB flash memory 4 may be removed from the USB interface 10j (#552).

As with the write target image data generating portion 104 of the first embodiment, the write target image data generating portion 152 controls the scanner 10e to scan the image depicted on the paper placed thereon; thereby to generate image data GDT to be written into the USB flash memory 4 (#553).

The image data encryption processing portion 153 encrypts the generated image data GDT by using a public key Kp associated with the user ID of the logged-on user (#554). The image data GDT that has undergone the encryption process is hereinafter referred to as "encrypted image data GDC". The encrypted image data GDC is associated with the device identifier 65 read out in Step #551, and is stored in the write target image data storage portion 181 (#555).

As with the first embodiment, after confirming the message displayed in Step #552, the user may remove the USB flash memory 4, carry the paper, and leave the location of the image forming apparatus 1 once. When the user comes to the installation site of the image forming apparatus 1 next time, the user can store the image data GDT into the USB flash memory 4.

[Process for Storing Image Data GDT into USB Flash Memory 4]

When the user comes to the location of the image forming apparatus 1 again, as with the first embodiment, he/she logs thereonto using his/her user ID. The user, then, inserts the USB flash memory 4 which is identical to the USB flash memory 4 used last time into the USB interface 10j. It is possible that the user comes to the location of the same image forming apparatus 1 as the image forming apparatus 1 onto which he/she logged last time, or, comes to the installation site of another image forming apparatus 1.

The processing details of the individual portions of each image forming apparatus 1 will be described below for the two cases described above, i.e., Case_A and Case_B, with reference to the flowchart of FIG. 9.

In Case_A, a device identifier reading portion 151, a secret key obtaining portion 161, an image data decrypting portion 162, an image data write processing portion 163 of the image forming apparatus 1A perform the following process.

When a USB flash memory 4 is inserted into the USB interface 10j, the device identifier reading portion 151 reads out a device identifier 65 of the USB flash memory 4 therefrom (#571). The secret key obtaining portion 161 performs a process for obtaining a secret key Ks of the logged-on user in a manner similar to that of the first embodiment (#572).

The image data decrypting portion 162 searches for encrypted image data GDC associated with the device identifier 65 read out by the device identifier reading portion 151 in the write target image data storage portion 181 (#573). If such encrypted image data GDC is found therein (Yes in #574), then the image data decrypting portion 162 decrypts the encrypted image data GDC by using the secret key Ks obtained by the secret key obtaining portion 161 (#577). In this way, the image data GDT is reproduced.

The image data write processing portion 163 writes the image data GDT thus reproduced onto the USB flash memory 4 (#578). When the user enters a command to delete the encrypted image data GDC (Yes in #579), the encrypted image data GDC is deleted from the write target image data storage portion 181 (#580). The image data write processing portion 163, then, displays, on the touchscreen 10h, a message indicating that the Scan_To_USB job has been completed and therefore the USB flash memory 4 may be removed from the USB interface 10j (#581).

On the other hand, in the case where encrypted image data GDC associated with the device identifier 65 is not found after the search (No in #574), the subject image forming apparatus 1 attempts to obtain the encrypted image data GDC from another image forming apparatus 1 (#575) in a manner similar to that of the first embodiment. This will be detailed later as the process corresponding to Case_B.

If encrypted image data GDC associated with the device identifier 65 is not found after the search (No in #574, and No in #576), then the image data write processing portion 163 displays, on the touchscreen 10h, a message indicating that image data GDT has not yet been generated (#582).

In Case_B, the device identifier reading portion 151, the secret key obtaining portion 161, the image data decrypting portion 162, the image data write processing portion 163 of the image forming apparatus 1A perform the following process in cooperation with an image data providing portion 172 of the image forming apparatus 1B.

As with Case_A, the device identifier reading portion 151 and the secret key obtaining portion 161 of the image forming apparatus 1A read out the device identifier 65 from the USB flash memory inserted into the USB interface 10*j* (#571), and obtain a secret key Ks of the logged-on user (#572).

The image data decrypting portion 162 searches for encrypted image data GDC associated with the device identifier 65 read out by the device identifier reading portion 151 in the write target image data storage portion 181. However, such encrypted image data GDC is not found in Case_B. If the encrypted image data GDC is not found therein (No in #574), then the image data downloading portion 171 requests another image forming apparatus 1 for the encrypted image data GDC and obtains the same (#575). At this time, the image forming apparatus 1A informs another image forming apparatus 1 of the device identifier 65 read out.

Upon receiving the information, the image data providing portion 172 of the image forming apparatus 1B reads out encrypted image data GDC corresponding to the informed device identifier 65 from the write target image data storage portion 181 of the image forming apparatus 1B, and transmits the encrypted image data GDC thus read out to the image forming apparatus 1A as the request source. If such encrypted image data GDC has not yet been generated, then the image data providing portion 172 of the image forming apparatus 1B sends a message indicating that such encrypted image data GDC has not yet been generated to the image forming apparatus 1A.

With the image forming apparatus 1A, if the encrypted image data GDC is successfully obtained (Yes in #576), then the image data decrypting portion 162 decrypts the encrypted image data GDC by using the secret key Ks obtained in Step #572 (#577). In this way, the encrypted image data GDC is reproduced.

The image data write processing portion 163 writes the encrypted image data GDC reproduced into the USB flash memory 4 (#578). The image data write processing portion 163 requests the image forming apparatus 1B from which the encrypted image data GDC has been sent to delete the encrypted image data GDC (Yes in #579, and #580).

On the other hand, if the image data write processing portion 163 receives a message indicating that the image data GDT has not yet been generated (No in #574, and No in #576), as with Case_A, the image data write processing portion 163 displays, on the touchscreen 10*h*, a message indicating that such image data GDT has not yet been generated (#582).

Figure 10:
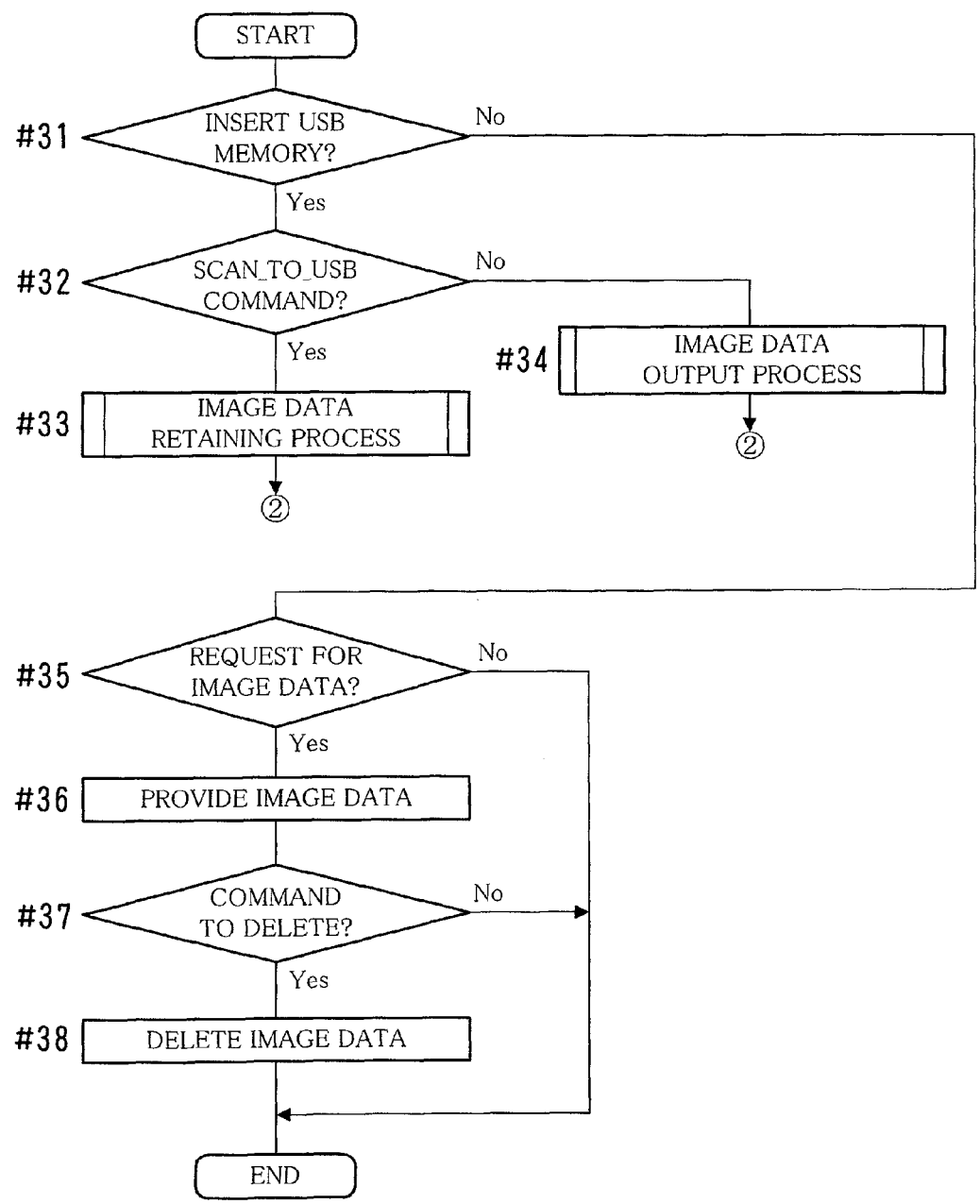
FIG. 10 is a flowchart depicting an example of the overall processing flow of an image forming apparatus according to a second embodiment.

FIG. 10 is a flowchart depicting an example of the overall processing flow of the image forming apparatus 1 according to the second embodiment.

The overall processing flow for a Scan_To_USB job in the second embodiment will be described below with reference to the flowchart of FIG. 10.

Every time an event occurs, the image forming apparatus 1 performs a process in accordance with the event in the following manner.

Referring to FIG. 10, when a USB flash memory 4 is inserted into the USB interface 10*j* (Yes in #31) and a command to execute a Scan_To_USB job is entered (Yes in #32), the image forming apparatus 1 performs a process for enabling a user to obtain image data GDT quickly for a case where he/she uses the image forming apparatus 1 next time (#33). The steps of the process are described earlier with reference to FIG. 8.

On the other hand, if a command to save image data GDT is entered (No in #32), then the image forming apparatus 1 performs a process for saving the image data GDT into the USB flash memory 4 (#34). The steps of the process are described earlier with reference to FIG. 9.

Alternatively, when the image forming apparatus 1 receives a request for encrypted image data GDC from another image forming apparatus 1 (No in #31, and Yes in #35), the image forming apparatus 1 reads out the requested encrypted image data GDC from the write target image data storage portion 181 and provides the same to another image forming apparatus 1 as the request source (#36). Thereafter, when receiving a command to delete that encrypted image data GDC, the subject image forming apparatus 1 deletes the encrypted image data GDC from the write target image data storage portion 181 (#38).

The first and second embodiments enable avoiding keeping a user waiting around the image processing apparatus 1, and at the same time, enable image data to be saved in a secure manner into a USB flash memory 4 of the user.

In the first and second embodiments, data is encrypted and decrypted based on public key cryptosystem. Instead, however, common key cryptosystem may be used to encrypt and decrypt data.

The first and second embodiments describe a case of saving image data of an image scanned by the scanner 10*e* into a USB flash memory 4. The present invention is also applicable to a case in which image processing is performed on image data saved in a box (a storage area corresponding to a directory in a personal computer); thereby to create another piece of image data, and the created image data is saved into the USB flash memory 4.

In the first embodiment, another configuration is possible in which, if a plurality of encrypted job tickets 61 are stored in one USB flash memory 4, a plurality of pieces of image data GDT corresponding to the individual encrypted job tickets 61 are presented as options, and a user is prompted to select image data GDT to be saved into the USB flash memory 4 from among the presented options. At this time, it is possible not to include, in the options, image data GDT corresponding to the encrypted job ticket 61 that has not succeeded in being decrypted to the job ticket 60. Further, in order for the user to identify which image data GDT has been saved into the USB flash memory 4, it is possible to present, to the user, the date and time at which a Scan_To_USB job has been executed for a case where the saved image data GDT has been generated. For example, the following messages may be presented to the user: "image data corresponding to a Scan_To_USB job executed at 04:56 on January 23 has been saved" or "Scan_To_USB job executed at 04:56 on January 23 has been completed".

Likewise, in the second embodiment, another configuration is possible in which, if a plurality of pieces of encrypted image data GDC are stored in association with one device identifier 65, a plurality of pieces of image data GDT corresponding to the individual pieces of encrypted image data GDC are presented as options, and a user is prompted to select image data GDT to be saved into the USB flash memory 4 from among the presented options. The same is similarly applied to the case of presentation of options and messages.

The first and second embodiments describe a case of using a USB flash memory as a portable storage medium. Instead, however, another storage medium may be used. Such a storage medium is, for example, a portable hard disk, a memory stick, a Secure Digital (SD) memory card, or a CD-ROM.

In the embodiments discussed above, the overall configurations of the network system NS and the image forming apparatus 1, the configurations of various portions thereof, the content to be processed, the processing order, the configuration of the data, and the like may be altered as required in accordance with the subject matter of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. A method for outputting image data generated by an image processing apparatus to a portable storage medium connected to an interface, the method comprising:
issuing an identifier of the image data;
encrypting the identifier by using an encryption key of a user who has given a command to generate the image data and writing the identifier thus encrypted into the storage medium without waiting for the image data to be generated completely by the image processing apparatus;
associating the image data with the identifier and storing the image data in a storage portion after generating the image data;
reading out the identifier from the storage medium when the storage medium is connected to the interface again;
decrypting the identifier; and
writing, into the storage medium, the image data stored in the storage portion in association with the identifier thus decrypted.

2. A method for outputting image data generated by an image processing apparatus to a portable storage medium connected to an interface, the method comprising:
reading out, from the storage medium, an identifier of the storage medium without waiting for the image data to be generated completely by the image processing apparatus;
associating the image data with the identifier after generating the image data,
encrypting the image data by using an encryption key of a user who has given a command to generate the image data and storing the image data thus encrypted in the storage portion;
reading out the identifier from the storage medium when the storage medium is connected to the interface again; and
decrypting the image data stored in the storage portion in association with the identifier thus read out and writing the image data thus decrypted into the storage medium.

3. An image processing apparatus comprising:
a generating portion that generates image data;
an identifier writing portion that writes an identifier for identifying the image data into a portable storage medium without waiting for the image data to be generated completely by the image processing apparatus;
a storage portion that stores the image data in association with the identifier;
a reading portion that reads out the identifier from the storage medium;
an image data writing portion that writes, into the storage medium, the image data stored in the storage portion in association with the identifier thus read out; and
a decrypting portion that decrypts data, wherein
the identifier writing portion encrypts the identifier by using an encryption key of a user who has given a command to generate the image data and writes the identifier thus encrypted into the storage medium,
after the identifier is read out from the storage medium, the decrypting portion decrypts the identifier, and
the image data writing portion writes, into the storage medium, the image data stored in the storage portion in association with the identifier thus decrypted.

4. An image processing apparatus comprising:
a generating portion that generates image data;
a first identifier reading portion that reads out, from a portable storage medium, an identifier of the storage medium without waiting for the image data to be generated completely by the image processing apparatus;
a storage portion that stores the image data in association with the identifier;
a second identifier reading portion that reads out the identifier from the storage medium when the storage medium is connected again; and
a writing portion that writes, into the storage medium, the image data stored in the storage portion in association with the identifier read out by the second identifier reading portion, wherein
the storage portion encrypts the image data by using an encryption key of a user who has given a command to generate the image data and stores the image data thus encrypted therein, and
the writing portion decrypts the image data and writes the image data thus decrypted into the storage medium.

5. A non-transitory computer-readable storage medium storing thereon a computer program used in an image processing apparatus for generating image data, the computer program causing the image processing apparatus to perform:
generating image data;
encrypting an identifier for identifying the image data by using an encryption key of a user who has given a command to generate the image data and writing the identifier thus encrypted into the storage medium without waiting for the image data to be generated completely;
storing, in a storage portion, the image data in association with the identifier;
reading out the identifier from the storage medium; and
decrypting the identifier, and
writing, into the storage medium, the image data stored in the storage portion in association with the identifier thus decrypted.

6. A non-transitory computer-readable storage medium storing thereon a computer program used in an image processing apparatus for generating image data, the computer program causing the image processing apparatus to perform:
generating image data;
reading out, from a portable storage medium, an identifier of the storage medium without waiting for the image data to be generated completely;
encrypting the image data by using an encryption key of a user who has given a command to generate the image data and storing the image data thus encrypted in the storage portion in association with the identifier;
reading out the identifier from the storage medium; and
decrypting the image data stored in the storage portion in association with the identifier thus read out and writing the image data thus decrypted into the storage medium.

* * * * *